June 11, 1968 H. E. THOMASON 3,387,602
SOLAR HEATER
Filed Oct. 22, 1965
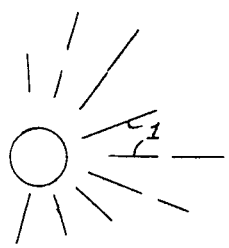
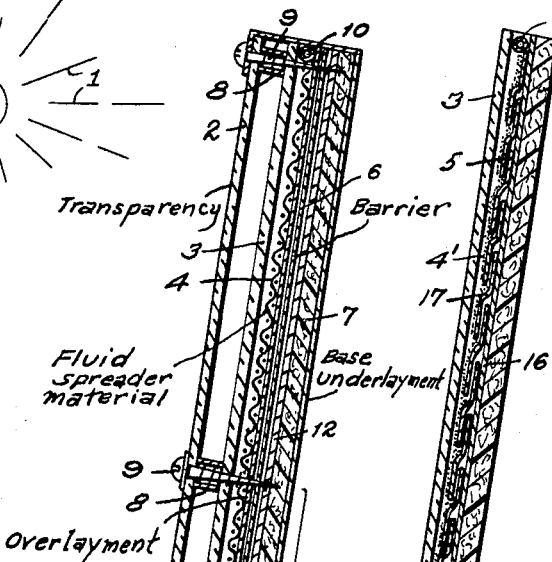
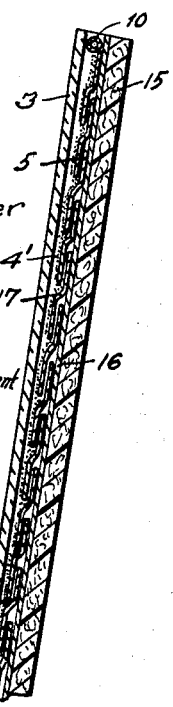
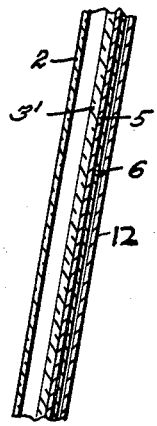
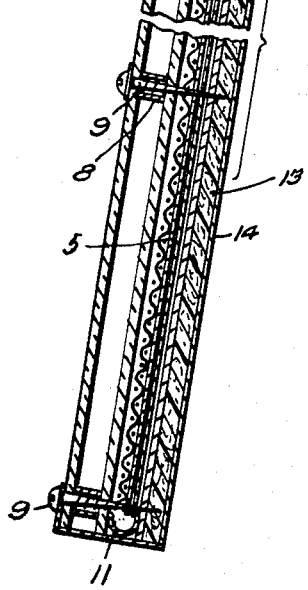
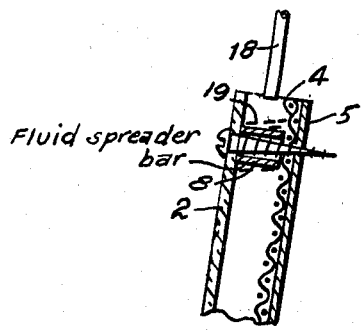
INVENTOR
Harry E. Thomason

United States Patent Office 3,387,602
Patented June 11, 1968

3,387,602
SOLAR HEATER
Harry E. Thomason, District Heights, Md. (6802 Walker Mill Road SE., Washington, D.C. 20027)
Continuation-in-part of application Ser. No. 46,213, July 29, 1960, which is a continuation-in-part of application Ser. No. 151,320, Nov. 9, 1961. This application Oct. 22, 1965, Ser. No. 501,964
16 Claims. (Cl. 126—271)

The present invention relates to an improved solar heat collector which is simple and low cost in construction, highly efficient in operation and which has a long life.

This application is a continuation-in-part of my copending Patent No. 3,254,643, for Solar Heat Apparatus, issued from application S.N. 46,213, filed July 29, 1960, and Patent No. 3,236,294, for Basementless Solar Home, issued from application S.N. 151,320, filed Nov. 9, 1961.

In the drawing:

FIG. 1 is a cross sectional view through one form of the invention;

FIG. 2 is a cross sectional view through a modified form of the invention;

FIG. 3 is a cross sectional view showing a detail of a further modification;

FIG. 4 is a modification of the fluid introducing and spreading apparatus.

Solar energy rays 1 enter the collector through one or more substantially transparent covers. One such cover is illustrated at 2. A solar heat collecting overlayment 5 has fluid spreader-heat collector material 4 closely adjacent thereto and a second substantially transparent cover 3 spaced closely adjacent to material 4. The overlayment 5, of glass fiber, asbestos, paper, wood, pulp, rag or the like, is impregnated with a fluid, as asphalt, coal tar pitch or such. A sand-asphalt, sand-coal tar mixture, or such may be used under certain conditions. The surface turned toward the sun is preferably dark or black and is capable of absorbing solar energy and converting it to heat. A barrier 6 and a base material 7 are preferably provided under overlayment 5, the base being insulating in character. Barrier 6, aluminum foil for example, minimizes passage of oils or fluids out of overlayment 5 and entrance of oxidizing air into this overlayment. Members 8, 9 secure the parts in assembled relationship.

The present invention may be used to heat various fluids. Water, for example, may be used as a fluid to transfer heat from the collector to a point of use or storage. Cold water may be introduced by distributor 10 to trickle and flow down between cover 3 and solar heat collecting overlayment 5 through solar heat absorber-fluid spreader 4, down to trough 11. The solar heat absorber-fluid spreader 4 may be wire mesh, rigid, non-fluid granular material such as sand, or such. Liquid attracting or liquid repelling agents may be used on fluid spreader 4 if desired to help keep the liquid in channels as it descends along the wire mesh or granular material. These agents may be used in parallel strips, ridges, or such, extending from top-to-bottom, to minimize side-skewing of the liquid. It has been found that a wetting agent, added to water, assists in spreading water over black sand-coated asphalt shingles as in FIG. 2, for example.

Underlayment base 7 may comprise, for example, wood sheeting 12, glass fiber or mineral wool 13 and aluminum heat reflective vapor barrier 14 to minimize reversed heat passage back through the collector at night. Barrier 14 also prevents moisture from entering the collector, and condensing on barrier 6.

In FIG. 3, instead of passing the heat transfer fluid to be heated between the overlayment 5 and transparency 3, as in FIG. 1, such fluid may be passed over transparency 3' between transparencies 3' and 2. Fluid flow channeling means, wetting agents or such may be used to obtain uniform wetting of transparency 3'. With this type of construction and operation the fluid spreader material 4 may be used or eliminated as desired. If material 4 is eliminated, inner transparency 3' may be placed directly in contact with overlayment 5, with no air or liquid passage space, to further reduce oxidation and loss of oils and fluids from the upper surface of the heat collecting overlayment.

The following discussion will lead to a better understanding of the principles involved and the value of the present combination of parts.

Numerous problems are encountered because of unusual conditions present in solar heating systems. In a solar heat collector, temperature extremes and temperature cycling deteriorate materials and much more rapidly than they would deteriorate under normal conditions. As examples, one researcher has written that screws used to hold collector parts together were pulled loose during temperature cycling because the collector expanded while collecting heat and contracted during the cool nighttime. Consequent pushing and pulling on the parts soon loosened the screws. The chief scientist of a paint company advises that most ordinary paints would soon crack and peel off from metal solar heat collector sheets due to high temperatures, and repeated temperature cycling, with expansion and contraction of the paint at a rate different from that of the collector sheet. One researcher reported shattering of substantially all of the glass covering soon after his large solar heat collectors for a house-heating system were constructed. Another reported that window glazing compounds, which would last more than twenty years in ordinary building construction, dried and cracked within a few years when used as solar heat collector glazing. Another report showed that a tough plastic film which would last five years or longer as a greenhouse covering material would fail quicker when used as an inner glazing material, "protected" by an outer glass covering, in a solar heat collector.

Products containing oils, asphalt, tar or such would appear useful in solar heat collectors. They are black and solar heat absorptive in character. They are not as subject to corrosion as some materials. They can be used to preserve certain materials. They are plastic when applied at moderate temperatures and are thereby capable of expanding and contracting with temperature changes. However, such materials have not been found satisfactory for use as solar heat collector sheets or as coatings for metal heat collector sheets. When the collector gets cold, asphalt or tar base coatings get hard, brittle, and tend to crack. As the collector gets hot the asphalt or tar base coatings tend to creep down the inclined sheet and drip from or pile up at the bottom. As the coatings age some of the oils oxidize and volatilize out leaving the coatings increasingly drier, brittle and "lifeless." The aging, oxidizing, drying process is accelerated by the high temperature baking in a solar heat collector, sometimes exceeding 250 degrees Fahrenheit.

In a preferred form of the present invention, a sheet of fibrous material is impregnated with asphalt, tar, oils or other fluids to help preserve the fibrous materials and keep them long-lived. The fibrous material, in turn, helps keep the preservative fluids from creeping and cracking. Difficulties arise, nevertheless, because the preservative fluids tend to oxidize, volatilize away and leave the fibrous material dry, brittle and subject to cracking and deterioration. Also, such sheets do not conduct heat readily, and tend to repel water. It is difficult to get heat collecting water to flow evenly over, fully contact, and collect the solar produced heat from such sheets. Thus, it would seem that a disadvantage offsets each advantage as we attempt to use products containing oils, asphalt, tar, etc.

The present invention discloses examples of certain combinations of parts and materials which render such fluid containing fibrous materials usable and long lived to collect solar heat and transfer it to a heat-transfer fluid, even in the extremely rough environmental conditions in solar heat collectors which have shattered glass, deteriorated tough plastic films, ruined paints and glazing compounds and torn screws from their anchorings.

Referring again to the drawing, if water is to be passed through the collector from distributor 10 to trough 11, and if the rigid or semi-rigid base underlayment 7 comprises a material at 12, such as plywood for example, it should be protected from water, water vapor or steam which is present between the transparency 3 and the solar heat collecting overlayment 5. The overlayment 5 itself preferably contains oils or other preservative softening fluids which render the overlayment long-lived and resistant to leakage of water, water vapor or steam. Vapor barrier 6 keeps oxidizing air from getting to overlayment 5. Barrier 6 may also be resistant to water vapor, in which event it gives added protection against water vapor damage to wood or such at 12. In addition, vapor barrier 6 should be resistant to oils, oil vapors and such coming from overlayment 5. Thus, barrier 6, which may be reflective metal foil, for example, minimizes oxidation in and escape of oils and volatilizable fluids from overlayment 5. This minimizes drying out and cracking of the overlayment, thereby adding greatly to the life of the overlayment.

High temperature baking and solar energy rays 1 accelerate oxidization and drive off the oils and volatilizable fluids from the upper surface also of overlayment 5. Substantially transparent cover 3 is provided to admit solar energy rays 1 and to minimize oxidation and escape of such oils and fluids from the upper surface. This cover is preferably very closely spaced above the overlayment to minimize the amount of air, convection currents, etc. and drying effects thereof, between the overlayment and transparent cover. The close spacing between the cover and overlayment also helps keep the fluid spread evenly over the solar warmed surfaces of the overlayment inside of the transparent cover.

The present invention departs from recommendations of the experts. The transparent cover 3 is placed in very close proximity to the overlayment collector sheet 5, instead of an inch or so above as is customary. This minimizes movement of the air and oxidization or drying of the collector sheet. Fluid spreader material 4 also helps reduce air convection currents. In the modification of FIG. 3 the transparency is preferably in contact with the collector sheet, thereby substantially eliminating contact of the hot oxidizing drying air with the overlayment collector sheet and prolonging the life of the overlayment.

A further benefit is realized from use of fluid spreader material 4, which is also a solar heat absorbing material. Such fluid spreader-heat collector material provides shade for much of the surface of overlayment 5 to thereby reduce the deteriorating effects of direct sunshine. In some instances fluid does not flow perfectly and absolutely uniformly over an entire solar heat collecting sheet or overlayment. A heat conducting mesh at 4 assures that the heat can flow through the mesh from areas of heat collection but poor or no fluid flow, to areas of good fluid flow.

The inner transparency 3, of plastic, glass or other, may be clamped under spreader-supports 8 if desired. The degree of tightness of the clamping of such spreader-support will squeeze the spreader material 4 more or less tightly against or into overlayment 5. This results in an adjustable valve action whereby the degree of spreading of the fluid may be adjusted. If desired spreader-supports 8 may be supported directly by fluid spreader material 4, and transparency 3 may extend between one member 8 and the next without extending beneath spreader supports 8.

In this type of construction also, members 8 serve to spread the fluid as it passes thereunder.

FIG. 4 illustrates that spreader-supports, as at 8, may be used for the initial spreading of the liquid as it is brought onto the heat collector overlayment 5. Thus, instead of using a distributor pipe with holes in it, as shown at the top of the collector in Patent Number 3,145,707, the liquid can be pumped onto the heat collecting overlayment directly, as at 18, in one or more main streams. The liquid, illustrated at 19, must then spread out into many small streams to pass under spreader-bar 8. Thus, we can eliminate a part, as distributor pipe 10, in FIG. 1, and yet retain the function, thereby simplifying the apparatus and lowering construction costs. If desired, the spreader 8 may be inclined slightly to aid in causing the fluid 19 to spread from the inlet pipe 18 toward the side or sides of the collector.

The spreader-supports, in this combination, yield an additional very important function in solar seat collectors which are vertical, or near vertical. In a construction as in Patent No. 3,145,707, wherein the heat collector sheet is corrugated, V-crimped, or similarly distorted, the "hills-and-valleys" become quite ineffective to channel the flow of liquid in parallel paths from top-to-bottom if the collector is stood vertically on end. If a corrugated sheet is stood vertically on end, there are no hills-and-valleys, only ins-and-outs. Therefore, fluid channeling ordinarily is not effective.

The construction described herein makes it feasible to operate the collector in a more nearly or completely vertical position and yet obtain good spreading characteristics of the fluid flow, and good contact between the fluid and the heat collecting overlayment, for reasons to follow. Cold liquid to be heated is introduced onto overlayment 5 by distributor 10, or by spreader-distributor 8 as described above. It clings to overlayment 5 and fluid spreader 4 by molecular attraction as it descends. However, molecular attraction within the liquid itself also tends to gather the liquid into streams. If such streams form, they are sometimes deviated from their normal downward path as they follow paths of least resistance, or of greatest molecular attraction or repulsion. If these streams traveled 10, 20, 30, 40, 50 feet or further down the collector overlayment, without being re-spread, this could leave large areas of heat collecting overlayment unvisited by the heat transfer liquid. However, the successive spreader-supports 8 keep re-spreading and redistributing the liquid as it descends the overlayment, thereby increasing contact between the liquid and the heat collecting materials at 4, 5, thereby increasing heat collection ability of the collector.

Barrier 14 is preferably both reflective of heat, and resistant to passage of vapor. The solar heat collector may be used as a wall of an enclosed area such as a swimming pool, a home or other building, where the air inside is warmed and has fairly large quantities of water vapor therein. Infrared heat rays are reflected back into the enclosed area if barrier 14 is reflective. Also, moisture within the area is prevented from entering the insulation 13 and condensing or freezing in the insulation or on vapor varrier 6 during cold nights or at other periods when solar energy input is low and barrier 6 is cool.

FIG. 2 illustrates a modification. One or more transparent covers may be used. A rigid or semi-rigid insulating material, such as foamed glass, foamed plastic, or such, is used at 15.

FIG. 2 also illustrates a detail as to how the heat collecting overlayment may be constructed. It has been found that, in solar heat collectors, some forms of overlayment containing asphalt or tar or other oil bearing or fluid containing materials, will expand and contract and thereby buckle and stretch as temperatures fluctuate widely, and as liquids, vapors, and humidity conditions adjacent to the overlayment fluctuate or are varied. This tends to shorten the life of the overlayment material and to disrupt and unbalance the flow of fluid over such overlayment. The overlayment here comprises a series of small sheets, preferably but not necessarily overlapped like shingles. Transparency 3, bearing directly on the overlayment, helps to overcome these problems by keeping the overlayment flat. If the transparency is fairly heavy and the collector is inclined, or flat, the weight of the transparency may be sufficient to keep the overlayment held firmly in place and to hold the flow of fluid to thin proportions. If the transparency is light in weight, or if the collector is mounted substantially vertically, spreader-support members 8 may be used as in FIG. 1 to clamp the transparency closely adjacent to the overlayment, spaced by fluid-spreader material 4', which may be screen wire, as illustrated in FIG. 1, non-volatilizable granules, or such.

The overlayment may be constructed as follows to further minimize the tendency to buckle and stretch. An under-overlayment member 16 may comprise one or more large sheets of material which have a minimum of joints per solar heat collector unit. If desired, these under-overlayment sheets may contain oils or other fluids to keep them from deteriorating and to keep them pliable, expandable and compressible. They may be overlapped or constructed as plies, with successive layers running at right angles to one another, or with wide overlaps of the plies, or with both features. Then, an outer-overlayment member 17, of smaller pieces of material, may be added, and the entire assembly secured to the rigid insulating base 15, or to a rigid underlayment as illustrated at 12 in FIG. 1. In such case a barrier may be added as at 6 in FIG. 1 and another barrier may be used between members 17 and 16. Such barriers may be aluminum foil, for example, which are simple and inexpensive and give further protection against transfer of water, steam, vapor or heat from heat-collecting overlayment 17 to the rigid underlayment 12 (FIG. 1) or 15 (FIG. 2).

Referring again to FIG. 3, overlayment 5 has a substantially transparent covering 3', preferably directly in contact with the upper surface of the overlayment. Thus, ambient air is precluded from coming into contact with the upper surface of the overlayment and oxidation and volatilization of the fluids in the overlayment are held to a minimum. Solar produced heat generated at the overlayment may be removed in one or more ways. As examples, the heat from the overlayment may be conducted to barrier 6 and picked up by a heat transfer fluid contacting the barrier. Alternatively, the heat from the overlayment may be conducted to transparency 3' (which also converts a portion of the solar energy into heat due to impurities in the transparency). The heat may be picked up by a heat transfer fluid contacting this transparency. One or more outer transparencies, as at 2, may be used adjacent to transparency 3' with heat transfer fluid being passed between transparency 3' and such outer transparency.

The present invention represents a further step forward in simplifying large solar heat collector construction and in cutting the cost. In the low temperature range especially, as used for some solar home heating systems, domestic water heating, swimming pool heating and such, the present invention is highly efficient in collecting solar heat.

What I claim is:

1. Solar heat collecting apparatus comprising: an insulating base underlayment; an overlayment of solar heat collecting material having an upper solar heat collecting surface, said overlayment comprising a relatively stable material containing a fluid, a portion of which oxidizes or volatilizes when exposed to heat or atmospheric conditions or both; a substantially transparent, substantially liquid-tight and substantially vapor-tight covering material closely adjacent to said overlayment to admit solar energy and to minimize oxidation and volatilization from the upper surface of said overlayment; means to introduce a heat transfer fluid to be heated to the space between said overlayment and said covering material; means between said overlayment and said covering material to spread said heat transfer fluid as it flows through said collector; and means to collect the heated fluid after it has passed through said collector for return to a point of use or storage.

2. Solar heat collecting apparatus as in claim 1 and a barrier between said underlayment and said overlayment and said barrier between substantially vaportight to minimize oxidation and volatilization from said overlayment to or through said underlayment.

3. Solar heat collecting apparatus as in claim 2 wherein said heat transfer fluid is a vaporizable liquid and wherein said covering serves the additional function of minimizing vaporization of heat transfer fluid upwardly and said barrier serves the additional function of minimizing leakage or vaporization of heat transfer fluid downwardly.

4. Solar heat collecting apparatus as in claim 1 wherein said means between said covering material and said overlayment comprises a mesh-like heat conducting material which helps conduct and distribute heat within the apparatus and which receives and absorbs solar radiations and converts such into heat.

5. Solar heat collecting apparatus as in claim 1 wherein said means between said covering material and said overlayment comprises a non-vaporizing granular material with surfaces which receive and absorb solar energy and convert such into heat.

6. Solar heat collecting apparatus comprising: an insulating base underlayment comprising sheeting material, such as wood, which would be adversely affected by water or water vapor; an overlayment of solar heat collecting material having an upper solar heat collecting surface, said overlayment comprising a non-rigid material containing a fluid which helps preserve and keep the material non-rigid but which tends to oxidize and volatilize when subjected to atmospheric conditions, or high solar heat collector temperatures, or both; vapor resistant reflective insulating material between said base underlayment and said overlayment to reduce vapor damage to said underlayment and heat losses therethrough; a substantially transparent vapor resistant covering material closely adjacent to said overlayment to minimize oxidation and volatilization from the upper surface of said overlayment and to admit solar energy to said overlayment while reducing heat radiations from said overlayment; means to introduce a heat transfer fluid to be heated to the space between said overlayment and said covering material; means between said overlayment and said covering material to spread said heat transfer fluid as it flows through said collector; means to collect the heated fluid after it has passed through said collector for return to a point of use or storage.

7. Solar heat collecting apparatus as in claim 6 and additional means to spread, and re-spread, said heat transfer fluid as it passes through said apparatus.

8. Solar heat collecting apparatus as in claim 6 wherein said underlayment additionally comprises glass fiber or mineral fiber insulation with a reflective foil surface turned toward and to reflect radiant heat emanating from said overlayment and said underlayment back toward such overlayment and said underlayment.

9. Solar heat collecting apparatus as in claim 8 wherein said insulation includes a vapor barrier with a heat reflective surface turned away from said overlayment and said underlayment to reduce reversal of heat travel through said solar collector, and to reduce entrance of moisture into said glass or mineral fiber thereby reducing condensation or icing on the reflective foil during periods of low solar heat input, such as at night.

10. Solar heat collecting apparatus comprising: a base for supporting elements of said collector and providing insulation means to minimize escape of heat through said base; a solar heat collecting overlayment supported by said base, said overlayment comprising non-rigid material containing oxidizable or volatilizable fluids which help keep the material non-rigid, non-hard and non-brittle and capable of expanding and contracting with temperature fluctuations, humidity fluctuations and such, said overlayment having a solar heat absorbing surface turned away from said base and toward incoming solar radiations; a substantially transparent member substantially parallel with said overlayment and in close proximity thereto to admit solar radiations and to minimize oxidation and volatilization of fluids from said overlayment; means to remove solar produced heat from said apparatus for transfer to a point of use or storage; and solar heat collecting-fluid spreader material between said substantially transparent member and said overlayment.

11. Apparatus as in claim 10 wherein said solar heat collecting-fluid spreader material comprises heat conducting mesh having solar heat absorbing surfaces, said mesh serving to collect solar energy, to reduce convection currents between the overlayment and transparent cover, to reduce oxidization and volatilization from said overlayment, to distribute and conduct heat within the collector, and serving to distribute and channel heat transfer fluid passing through the heat collecting apparatus.

12. Apparatus as in claim 10 wherein said solar heat collecting-fluid spreader material comprises non-volatilizable granular material having solar heat absorbing surfaces, said granular material serving to collect solar energy, to reduce convection currents between the overlayment and transparent cover, to reduce oxidization and volatilization from said overlayment, and serving to distribute and spread heat transfer fluid passing through the heat collecting apparatus.

13. Apparatus as in claim 10 wherein said base comprises rigid or semi-rigid foam insulation.

14. Apparatus as in claim 10 wherein said base comprises fluffy insulation material such as glass fiber or mineral wool; a vapor barrier between said insulation material and said overlayment to minimize passage of fluids into said insulation and to minimize escape of fluids from or oxidization of said overlayment fluids.

15. Apparatus as in claim 10 and a second substantially transparent member spaced from said first transparent member; spreader-supports between said transparent members to keep re-spreading and re-distributing fluid as it flows over and receives heat from said solar heat collecting overlayment.

16. Means for introducing, distributing and spreading fluid into a solar heat collector comprising: a solar heat collecting sheet; fluid spreader material adjacent to the upper surface of said heat collecting sheet; a fluid spreader member extending substantially horizontally across said heat collecting sheet and spaced closely adjacent to said heat collecting sheet; and means to introduce fluid to be heated to said solar heat collector so that the fluid will spread out along said fluid spreader member, as restricted by said member, and will pass thereby through said fluid-spreader material.

References Cited

UNITED STATES PATENTS

| | | | |
|---|---|---|---|
| 2,427,262 | 9/1947 | Delano. | |
| 3,102,532 | 9/1963 | Shoemaker | 126—270 |
| 3,146,774 | 9/1964 | Yellott | 126—271 |
| 3,194,228 | 7/1965 | Bargues | 126—271 |

FOREIGN PATENTS

| | | |
|---|---|---|
| 763,867 | 2/1934 | France. |
| 840,926 | 1/1939 | France. |

CHARLES J. MYHRE, *Primary Examiner.*